United States Patent
Takemura et al.

(10) Patent No.: US 6,317,407 B1
(45) Date of Patent: Nov. 13, 2001

(54) OPTICAL DISK HAVING READ-ONLY AND REWRITABLE AREAS WITH OVERLAPPING FORMATS

(75) Inventors: Yoshinari Takemura, Settsu; Takashi Ishida, Yawata; Shunji Ohara, Higashiosaka; Isao Satoh, Neyagawa, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/545,647

(22) Filed: Apr. 10, 2000

Related U.S. Application Data

(63) Continuation of application No. 08/954,929, filed on Oct. 21, 1997, now Pat. No. 6,078,559.

(30) Foreign Application Priority Data

Oct. 23, 1996  (JP) .................................................. 8-280491

(51) Int. Cl.⁷ ...................................................... G11B 7/24
(52) U.S. Cl. ...................................... 369/275.3; 369/275.1
(58) Field of Search ............................. 369/275.3, 275.4, 369/275.1, 13, 47.1, 47.15, 32, 53.11, 53.2, 124, 44.29, 47.16, 44.36

(56) References Cited

U.S. PATENT DOCUMENTS

| | | |
|---|---|---|
| 5,023,854 | 6/1991 | Satoh et al. . |
| 5,521,900 | 5/1996 | Ando et al. . |
| 5,537,387 | 7/1996 | Ando et al. . |
| 5,737,639 | 4/1998 | Ohmori . |
| 5,812,519 * | 9/1998 | Kawamura et al. ............... 369/275.1 |

FOREIGN PATENT DOCUMENTS

| | | |
|---|---|---|
| 0542730 | 1/1987 | (EP) . |
| 0555065 | 8/1993 | (EP) . |
| 0613144 | 8/1994 | (EP) . |
| 0768648 | 4/1997 | (EP) . |
| 0893792 | 1/1999 | (EP) . |
| 62197929 | 9/1987 | (JP) . |
| 62285232 | 12/1987 | (JP) . |
| 2232831 | 9/1990 | (JP) . |
| 8022640 | 1/1996 | (JP) . |
| 0256918 | 9/1995 | (TW) . |

OTHER PUBLICATIONS

Taiwanese Office Action dated May 3, 1999 and related to Taiwanese Application No. 86115630 (English translation included).

* cited by examiner

*Primary Examiner*—Ali Neyzari
(74) *Attorney, Agent, or Firm*—Renner, Otto, Boisselle & Sklar, LLP

(57) ABSTRACT

The optical disk of this invention includes a read-only area in which a plurality of read-only tracks are formed and a rewritable area in which a plurality of rewritable tracks are formed, wherein each of the plurality of read-only tracks is divided into a plurality of first sectors, a signal is prerecorded in at least one of the plurality of first sectors under a predetermined reproduction format, each of the plurality of rewritable tracks is divided into a plurality of second sectors, a signal is recordable in at least one of the plurality of second sectors under a predetermined recording format including the predetermined reproduction format, and the read-only area is located on an inner portion of the optical disk, while the rewritable area is located on an outer portion of the optical disk.

14 Claims, 10 Drawing Sheets

FIG. 1

| Diameter (mm) | | | Zone name | Sector address (hex value) | No. of blocks | No. of tracks | Data ID |
|---|---|---|---|---|---|---|---|
| ↑ 22.6 | Lead-in area | Read-only area | | —27AB0h— | | ↑ | |
| | | | Blank (00h) | | | | |
| 23.86 | | | Ref. signal | —2F000h— | 1 | 1896 | —2F000h— |
| 23.83 | | | Blank (00h) | —2F010h— | 31 | | —2F010h— |
| | | | | —2F200h— | | | —2F200h— |
| | | | Control data | | 192 | | |
| 23.98 | | | | —2FE00h— | | | —2FE00h— |
| | | | Blank (00h) | | 32 | | |
| | | | | —2FFFFh— | | ↓ | |
| 24.00 mm | | Rewritable area | Connection | —30000h— | 2–8 | | —30000h— |
| | Data area | | Guard track | —30200h— | 32 | | —30200h— |
| | | | Disk test | —30600h— | 64 | | —30600h— |
| | | | Drive test | —30D00h— | 112 | | —30D00h— |
| | | | Guard track | —30F00h— | 32 | 1888 | —30F00h— |
| | | | Disk ID | —30F80h— | 8 | | —30F80h— |
| 24.18 | | | DMA 1&2 | —31000h— | 8 | | —31000h— |
| 25.40 | | | Zone 0 | —37D60h— | 1750 | | —377E0h— |
| 26.79 | | | Zone 1 | —40220h— | 2124 | 1888 | —3F580h— |
| | | | | | | | |
| 56.13 | | | Zone 22 | —158D80h— | | | —1491E0h— |
| 57.53 | | | Zone 23 | —16B480h— | 4720 | 1888 | —16B480h— |
| | | | DMA 3&4 | —16B500h— | 8 | | —16B500h— |
| | Lead-out area | | Disk ID | —16B580h— | 8 | | —16B580h— |
| | | | Guard track | —16B780h— | 32 | 1446 | —16B780h— |
| | | | Drive test | —16BE80h— | 112 | | —16BE80h— |
| | | | Disk test | —16C580h— | 112 | | —16C580h— |
| 58.60 | | | Guard track | —17966Fh— | 3343 | ↓ | —17966Fh— |

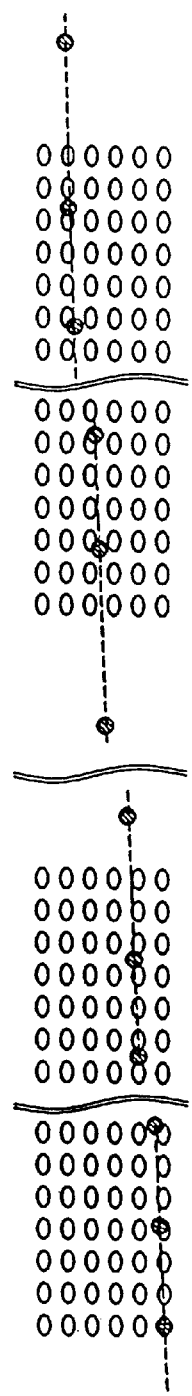
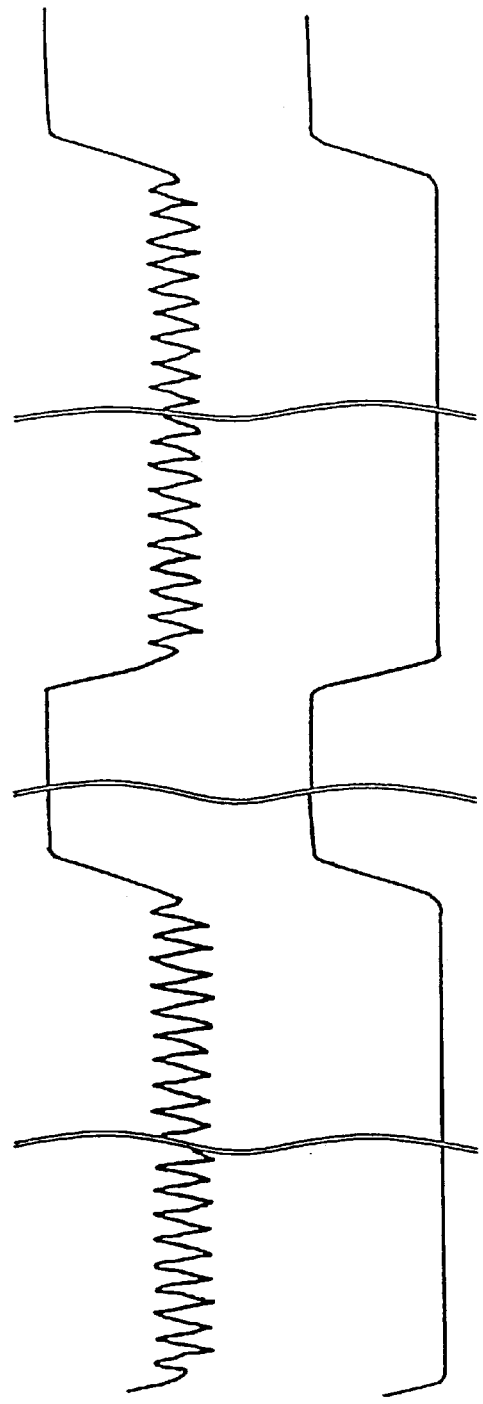
FIG.3A PRIOR ART Beam track
FIG.3B PRIOR ART Reflection light amount
FIG.3C PRIOR ART Band limit PRIOR ART    Track format for PEP region PRIOR ART    Sector format for PEP region

OPTICAL DISK HAVING READ-ONLY AND REWRITABLE AREAS WITH OVERLAPPING FORMATS

The present application is a continuation of U.S. patent application Ser. No. 08/954,929, filed Oct. 21, 1997 and now U.S. Pat. No. 6,078,559.

BACKGROUND OF THE INVENTION

1. Field of the Invention

The present invention relates to an optical disk, and more particularly relates to a rewritable optical disk having a control data signal representing the type of the disk and the like recorded thereon.

2. Description of the Related Art

In recent years, various types of optical disks, for example, read-only types such as a CD and a CD-ROM and types which allow for data recording such as a data addition type and a rewritable type, have been widely used. Some of such optical disks of the read-only type, the data addition type, and the rewritable type are the same in appearance and the like, though they are different in type from each other.

Some of the optical disks are different from others in format type and parameters to be set at recording and/or reproduction. Information on the format type and information for setting parameters is therefore prerecorded as control data signals in a predetermined region of the disk, so that the control data signals are read with a drive for reproducing/recording data from/on the optical disk before various parameters are set for the drive.

A method for recording such control data signals on an optical disk will be described, using a "130 mm rewritable optical disk" as an example.

The "130 mm rewritable optical disk" has a format defined by JIS X6271. Two types of formats are defined by the standard: i.e., Format A where continuous grooves are formed spirally on a disk, and lands between adjacent grooves are used as tracks for recording signals; and Format B where marks for sampling are formed on a disk to allow for tracking control by a sample servo method. The two formats are common in the configuration of a control information track where the control data signals are recorded. That is, the control information track is specified to have a PEP region, an inner SFP region, and an outer SFP region for the two formats.

The PEP region is located on the innermost portion of the disk, where prerecord marks (also called embossed pits), obtained by modulating with low-frequency phase-modulated recording codes, are used. All the marks in the PEP region are arranged so as to be aligned in the radial direction of the disk. This arrangement is schematically shown in FIG. 3A. Each prerecord mark and each space between adjacent prerecord marks are two channel bits long. One PEP bit cell has a length of 656±1 channel bits. FIG. 4 shows forms of such PEP bit cells. The information of the PEP bit cell is represented by a phase-modulated recording code. A PEP bit cell where marks are formed in the first half thereof represents logical 0, while that where marks are formed in the second half thereof represents logical 1. A total of 561 to 567 PEP bit cells of the above forms per track are recorded on the disk.

The PEP region has a track format shown in FIG. 5A, which includes three sectors. FIG. 5B shows a sector format of each sector. The numbers shown in FIGS. 5A and 5B represent the numbers of PEP bit cells allocated to respective signals. A data region of the sector format where various control signals are recorded has a capacity of 18 bytes (144 PEP bit cells) (hereinafter, bytes are referred to as "B"). For example, a signal representing the format (Format A or B) to be used by the disk is recorded in byte 0. The details on other control signals to be recorded on the data region are specified in the aforementioned JIS standard. The description thereof is therefore omitted here.

When the PEP region with the above format is illuminated with light with an optical head or the like, light is focused on a signal recorded surface of the disk by focusing control. Since marks are aligned in the radial direction in the PEP area, signals can be reproduced without tracking control.

FIG. 3A also shows an example of a beam track. The portion where no marks are formed serves as a mirror, producing a large amount of reflection light. The portion where marks are formed diffracts reflection light depending on whether or not the marks exist at respective positions on the disk. Therefore, the average level of the amount of reflection light is low compared with that of the mirror portion.

FIG. 3B shows a change in amount of reflection light. Since the repetition frequency of the marks is higher than the period of the PEP bit cells, mark signal components can be eliminated by limiting the band for a reproduction signal. The waveform of the reproduction signal obtained by band limit is shown in FIG. 3C. The information of each PEP bit cell can be detected by examining the level of the reproduction signal.

Then, the inner and outer SFP regions of the control information track will be described. The same information is recorded in the inner and outer SFP regions. That is, prerecord marks are recorded in the inner and outer SFP regions under a standard user data format. A 512 B region is allocated for the control data signals. For example, the same information as the 18 B information recorded in the PEP regions is recorded in bytes 0 to 17. The details on other control information to be recorded in this region are specified in the aforementioned JIS standard. The description thereof is therefore omitted here.

FIG. 6 shows an example of the standard user data format of each sector where the user data capacity is 512 B and Format A is used. The numbers shown in FIG. 6 represent the numbers of bytes (B) allocated to respective signals. The capacity of the data region becomes 650 B including an error correction code, resynchronization bytes, and control bytes in addition to the 512 B user bytes.

This sector for recording signals in the data region also includes the following regions: a prerecorded address section composed of a sector mark (SM) indicating the head of the sector, a VFO region for synchronizing clock reproduction, an ID region indicating the address of the sector, an address mark (AM) indicating the head of the ID region, and the like; and regions for rewriting data, such as an offset detection region (ODF), an ALPC used for detection of laser output, and a buffer region provided to avoid overlap with a subsequent sector.

The total capacity of the sector is therefore 746 B. Although the control data recorded in the SFP regions are prerecord marks, the capacity of 746 B is required to record the 512 B control signals, as in the case of recording user data, since the control data is recorded under the user data format.

In recent years, read-only optical disks in which digitized and compressed image and sound signals are recorded have been proposed. FIGS. 7A to 7C show an example of a sector format of one of such read-only optical disks called a DVD (digital video disk).

A 2048 B unit of information data such as image and sound is recorded in one sector. This unit is called a first data signal. The sector also includes a 4 B data ID, a 2 B IED for error detection of the data ID, a 6 B RSV as reservation, and a 4 B EDC for error detection of the entire sector. Such one sector including these regions is called a first data unit. FIG. 7A shows a configuration of the first data unit which has a data length of 2048+4+2+6+4=2064 (B).

The information data (2048 B) is scrambled in the following manner. A shift register is constructed so that so-called M-series data is generated. An initial value is set for the shift register, and is sequentially shifted in synchronization with the data, so as to generate pseudorandom data. An exclusive-OR between the generated pseudorandom data and the information data to be recorded is calculated every bit. Thus, the information data (2048 B) is scrambled.

A total of 16 sectors of the thus-scrambled first data units are put together to constitute an error correction code of Reed Solomon coding. In such an error correction code, each data unit constituting one sector is arranged in an array of 172 B×12 rows and a total of 16 sectors of such data units are put together to constitute an array of 172 B×192 rows. A 16 B outer code is added to each column of the array, and then a 10 B inner code is added to each row of the resultant array. As a result, as shown in FIG. 7B, a data block of 182 B×208 rows (37856 B) is formed. This data block is called an ECC block.

The ECC block is then interleaved so that the 16 B outer codes are included in the respective sectors. Thus, the data capacity of each sector becomes 182 B×13 rows =2366 B.

The resultant data is then modulated with a recording code. A RLL (run length limited) code where the run length after modulation is limited is used as the recording code. As an example, a 8/16 conversion code which converts 8-bit data into 16-channel-bit data is used. This conversion is conducted based on a predetermined conversion table. According to this conversion, DC components included in the recording code can be suppressed by controlling the code selection, though the detailed description of this control is omitted here.

In this modulation, the minimum and maximum bit lengths are limited to 3 and 11 channel bits, respectively. In order to secure synchronization at reproduction, a 2 B synchronization code is inserted every 91 B, i.e., a half of one row of 182 B. As the synchronization code, several different codes with a length of 32 channel bits having patterns which normally do not appear in the 8/16 conversion code are predetermined. This period of 93 B data including the synchronization code is called a frame. This configuration is shown in FIG. 7C. Thus, the data capacity of each sector is now 186 B×13 rows=2418 B.

In a read-only DVD having a single signal recording surface, data is recorded by forming pits on the disk from the inner circumference thereof toward the outer circumference at a constant linear velocity (i.e., by CLV driving) in accordance with the above-described sector format. A read-only DVD having double signal recording surfaces has also been proposed, though the description of data recording on such a disk is omitted here.

FIG. 8 shows a configuration of signal recording areas of the read-only DVD. A lead-in area is located on the innermost portion of the disk, which starts at a diameter of 22.6 mm. A data area where information data such as image and sound is recorded starts at a diameter of 24.0 mm and ends at a diameter of 58.0 mm at maximum. A lead-out area follows the data area and ends at a diameter of 58.5 mm at maximum. The sector address is 30000 in the hexadecimal notation (denoted as 30000h) at the head of the data area, and increases by 1h every sector toward the outer circumference of the disk. In the lead-in area, the sector address decreases by 1h every sector toward the inner circumference of the disk.

The control information is recorded in the lead-in area under the sector format described above. In the lead-in area, a reference code which is used for identification of the disk manufacturer, reproduction adjustment, and the like is recorded over two ECC blocks covering sector addresses starting from 2F0000h to 2F020h. The control data is recorded over 192 blocks covering sector addresses from 2F200h to 2FE00h. In the other sectors in the lead-in area, information data is recorded as 00h under the sector format described above.

A rewritable DVD which is compatible in format with the above-described read-only DVD has been proposed. In such a rewritable optical disk, spiral or concentric grooves are formed on a disk substrate, and a recording film is formed on the substrate to define tracks along the grooves. In order to maximize the recording capacity, both grooves and lands between adjacent grooves are used as recording tracks.

Each track is divided into a plurality of sectors as units for data recording and reproduction. Address information is added to each sector so that the position of required information data can be managed to facilitate high-speed data retrieval. More specifically, a header region which includes an ID signal representing the address information of the sector is provided at the head of the sector.

In order to secure the compatibility with the read-only DVD, the rewritable DVD has a format so that the 2418 B data of one sector of the read-only DVD can be recorded in a user data region of one sector of the rewritable DVD as a unit. This 2418 B data is called a second data signal.

The sector format for the rewritable DVD also requires an ID region indicating the address number of the sector and a buffer region, as in the case of the optical disk according to the aforementioned JIS standard. The total capacity of the sector including these regions is preferably a multiple of the frame length (93 B) of the format for the read-only disk.

FIG. 9 shows an example of the format for the rewritable DVD which satisfies the above requirements. The 2048 B data (first data signal) is arranged under a format similar to that used f or the read-only DVD described above, to obtain 2418 B data (second data signal), and the resultant 2418 B data is recorded in a data region 91 shown in FIG. 9. A 1 byte postamble (PA) region 92 follows the data region 91. In the case of the 8/16 conversion code, the end of the recording code should be identified so that the converted data can be correctly decoded. The PA is provided to identify the end of the recording code, and a pattern obtained by modulating a predetermined code in accordance with a modulation rule is recorded.

A PS region 93 precedes the data region 91, where a presync signal is recorded to indicate the start of the data region and obtain byte synchronization. As the presync signal, a code with a length of 3 B (48 channel bits) which has high autocorrelation is predetermined. A VFO region 94 precedes the PS region 93, where a signal with a specific pattern is recorded to obtain prompt and stable clocking of a PLL (phase-locked loop) of a reproduction circuit.

The specific pattern of the signal is, for example, a repetition of a 4-channel-bit pattern, i.e., " . . . 1000 1000 . . . " as represented in NRZI coding. The length of the VF0 region 94 is 35 B to secure the frequency of the inversion and the duration required for stable clocking.

A first guard data region 95 precedes the VFO region 94, while a second guard data region 96 follows the PA region 92. In a rewritable recording medium, the head and end portions of the recording area thereof degrade after repeated recording and deletion. The guard data regions 95 and 96 are therefore required to have a length large enough to prevent the degradation from affecting the area from the VFO region 94 to the PA region 92. It has been found from experiments that the lengths of the first and second guard data regions 95 and 96 should be 15 B and 45 B, respectively. Data to be recorded in these guard data regions are, for example, the same repetition of the 4-channel-bit pattern as that used for the VFO region 94, i.e., " . . . 1000 1000 . . . ".

A gap region 97 is provided for setting a laser power. The length of the gap region 97 is 10 B to secure the time required for the setting of the laser power. A buffer region 98 is provided to secure a time width where no data is recorded to ensure that the end of the recording data does not overlap a subsequent sector even if a variation in rotation of a disk motor or disk eccentricity occurs. The length of the buffer region 98 is 40 B.

The above regions 91 to 98 constitute an area where rewritable data is recorded and has a total length of 2567 B. The signal recorded in this area is called a third data signal.

A 2 B mirror region 99 is provided to secure the time required for determining an offset of the servo tracking.

Next, a header region 100 will be described. As shown in FIG. 9, a first half 19 and a second half 20 of the header region 100 are displaced from the center line of the groove in the opposite radial directions from each other by about a quarter of the pitch of the groove, so that the header region can be read from both the groove track and the land track. The header region 100 includes total four sector ID signals (PIDs). For the groove track, for example, sector ID signals PID1 and PID2 in the first half 19 are displaced toward the outer circumference of the disk, while sector ID signals PID3 and PID4 in the second half 20 are displaced toward the inner circumference of the disk.

A 4 B Pid region representing the address information of the sector is provided in each sector ID signal PID. In the Pid region, 3 B is allocated for the sector number and the remaining 1 byte is allocated for various types of information such as the PID number. In a Pid3 region 113 and a Pid4 region 118, the address information of the sector on the groove track having the center line from which the PIDs are displaced is recorded. In a Pid1 region 103 and a Pid2 region 108, the address information of the sector on the land track adjacent to the groove track on the inner side thereof is recorded. IED regions 104, 109, 114, and 119 with a length of 2 B represent an error detection code for the preceding respective Pid regions. The data in the Pid regions and the IED regions are modulated with the 8/16 conversion code described above. In order to identify the end of the conversion code, 1 byte postamble (PA) regions 105, 110, 115, and 120 are provided.

AM regions 102, 107, 112, and 117 precede the respective Pid regions, where address mark signals are recorded to indicate the start of the Pid regions and obtain byte synchronization. Each address mark signal has a length of 3 B (48 channel bits), and a code having a pattern which does not appear in the 8/16 conversion code is predetermined.

First and second VFO regions 101, 111, 106, and 116 are provided at the heads of the respective PIDs. As in the VFO region 94, the repetition of the 4-channel-bit pattern, " . . . 1000 1000 . . . " is used for these VFO regions. In the header region 100, the first half including the sector ID signals PID1 and PID2 and the second half including the sector ID signals PID3 and PID4 are displaced in the opposite radial directions as described above. Accordingly, in order to resume the bit synchronization, the first VFO regions 101 and 111 located at the heads of the first and second halves of the header region 100 are made long. On the contrary, the second VFO regions 106 and 116 of the first and second halves may be short since they are only required for re-synchronization. For example, the lengths of the first and second VFO regions are 36 B and 8 B, respectively.

As a result, the total length of one sector of the rewritable DVD is 2697 B. Thus, the length of one sector of the rewritable DVD is larger than that of one sector of the read-only DVD by 279 B (corresponding to three frames).

As described above, in the rewritable DVD, as in the read-only DVD, it is necessary to prerecord the control data signals indicating various types of control information. This can be performed using the prerecord marks, as in the case of the above-described "130 mm rewritable optical disk", under the sector format used for the "130 mm rewritable optical disk". The length of one sector of the rewritable DVD is larger than that of one sector of the read-only DVD by about 10% or more as described above. Since the control data signals are recorded at the fabrication of the disk and will not be rewritten, this increase in the sector length is unnecessary for the recording of the control data signals. This unnecessary increase in sector length is therefore disadvantageous for DVDs which are demanded to have a large capacity.

A drive for DVD disks is required to be able to record and/or reproduce both read-only DVDs and rewritable DVDs However, the read-only DVDs and the rewritable DVDs are different in sector format. The type of the disk mounted in the drive can be identified by reading the control data signal. However, in order to read the control data signal, the format of the disk must be identified to locate the recorded position of the control data signal.

In order to identify the type of the disk, a region with the same sector format may be set for both the read-only type and the rewritable type using rerecord marks so as to record a signal indicating the type of the disk in the region, as in the case of the PEP region of the above-described "130 mm rewritable optical disk". This common region is first reproduced at the activation of the disk to identify the type of the disk. Once the type of disk is identified, the control data on the disk can be reproduced in accordance with the format for the disk. However, as in the case of the "130 mm rewritable optical disk", the signal indicating the type of the disk recorded on the common area is the signal recorded as part of the control data signal. Recording the same control data signal on two different regions results in redundancy of the recording area. The redundancy of the recording area is disadvantageous for DVDs which are demanded to have a large capacity.

In view of the foregoing, the objective of the present invention is to provide an optical disk in which control data signals are recorded under a format which can be easily read regardless of the type of the-optical disk, a read-only DVD or a rewritable DVD, and redundancy is reduced to improve the recording capacity.

SUMMARY OF THE INVENTION

The optical disk of this invention includes a read-only area where a plurality of read-only tracks are formed and a rewritable area where a plurality of rewritable tracks are formed, wherein each of the plurality of read-only tracks is divided into a plurality of first sectors, a signal is prerecorded in at least one of the plurality of first sectors under a predetermined reproduction format, each of the plurality of rewritable tracks is divided into a plurality of second sectors, a signal is recordable in at least one of the plurality of second sectors under a predetermined recording format including the predetermined reproduction format, and the read-only area is located on an inner portion of the optical disk, while the rewritable area is located on an outer portion of the optical disk.

In one embodiment of the invention, the plurality of first sectors of the plurality of read-only tracks are aligned in a radial direction of the optical disk.

In another embodiment of the invention, a pit array is formed in the read-only area, spiral or concentric grooves are formed in the rewritable area, and the depth of the pit array is substantially the same as the depth of the grooves.

In still another embodiment of the invention, a reference signal for reproduction adjustment is prerecorded in the first sectors of the number equal to a multiple of the number of first sectors included in one error correction block, and the first sectors where the reference signal is prerecorded are located within one cycle of the read-only track.

In still another embodiment of the invention, the rewritable area includes a data area where user data is recordable, a lead-in area having a zone for test recording, and a lead-out area having a zone for test recording, and the lead-in area is located on an inner side of the data area, and the lead-out area is located on an outer side of the data area.

Alternatively, the optical disk of this invention includes a read-only area where a plurality of read-only tracks are formed and a rewritable area where a plurality of rewritable tracks are formed, wherein each of the plurality of read-only tracks is divided into a plurality of first sectors, a signal is prerecorded in at least one of the plurality of first sectors under a predetermined reproduction format, each of the plurality of rewritable tracks is divided into a plurality of second sectors, a signal is recordable in at least one of the plurality of second sectors under a predetermined recording format including the predetermined reproduction format, the read-only area is located on an inner portion of the optical disk, while the rewritable area is located on an outer portion of the optical disk, and a connection zone is provided between the read-only area and the rewritable area, neither the signal under the predetermined reproduction format nor the signal under the predetermined recording format is recorded in the connection zone.

In one embodiment of the invention, the width of the connection zone in the radial direction is set smaller than an amount of eccentricity of the optical disk.

In another embodiment of the invention, an address increased by one address from an address of a last sector in the read-only area is used as an address of a head sector in the rewritable area.

Alternatively, the optical disk of this invention is compatible with a read-only optical disk which includes a read-only area having a plurality of read-only tracks, each of the plurality of read-only tracks being divided into a plurality of first sectors, signals being prerecorded in at least one of the plurality of first sectors under a predetermined reproduction format. The optical disk includes a read-only area where a plurality of read-only tracks are formed and a rewritable area where a plurality of rewritable tracks are formed, wherein each of the plurality of read-only tracks is divided into a plurality of first sectors, a signal is prerecorded in at least one of the plurality of first sectors under a predetermined reproduction format, each of the plurality of rewritable tracks is divided into a plurality of second sectors, a signal is recordable in at least one of the plurality of second sectors under a predetermined recording format including the predetermined reproduction format, and the read-only area is located on an inner portion of the optical disk, while the rewritable area is located on an outer portion of the optical disk.

In another embodiment of the invention, an address of a sector for recording a control data signal is the same as an address of a sector for recording a control data signal of the read-only optical disk.

In still another embodiment of the invention, an address of a head sector in the rewritable area is the same as an address of a head sector in a data area of the read-only optical disk.

In still another embodiment of the invention, a radial position of a head sector in the rewritable area is the same as an radial position of a head sector in a data area of the read-only optical disk.

In still another embodiment of the invention, a logical address of a sector in a data area of the rewritable area is obtained by adding a logical address to a physical address of a head sector in the data area.

In still another embodiment of the invention, a logical address of a head sector in a data area of the rewritable area is the same as an address of a head sector in a data area of the read-only optical disk.

Thus, according to one aspect of the present invention, the optical disk includes the read-only area where a plurality of read-only tracks are formed and the rewritable area where a plurality of rewritable tracks are formed. Each of the plurality of read-only tracks is divided into a plurality of first sectors. A signal is prerecorded in at least one of the plurality of first sectors under a predetermined reproduction format. Each of the plurality of rewritable tracks is divided into a plurality of second sectors. A signal is recordable in at least one of the plurality of second sectors under a predetermined recording format including the predetermined reproduction format. The read-only area is located on the inner portion of the optical disk, while the rewritable area is located on the outer portion of the optical disk.

Accordingly, the control data signal is recorded in the read-only area where a region for recording header information is not provided. This means that the control data signal is recorded under the reproduction format for the first sectors in the read-only area which is lower in redundancy than the sector format for the second sectors in the rewritable area. This improves the efficiency of the recording region of the rewritable optical disk.

Also, the optical disk according to the present invention is compatible with the read-only optical disk, and includes the read-only area where a plurality of read-only tracks are formed and the rewritable area where a plurality of rewritable tracks are formed. Each of the plurality of read-only tracks is divided into a plurality of first sectors. A signal is prerecorded in at least one of the plurality of first sectors under a predetermined reproduction format. Each of the plurality of rewritable tracks is divided into a plurality of second sectors. A signal is recordable in at least one of the plurality of second sectors under a predetermined recording format including the predetermined reproduction format. The read-only area is located on the inner portion of the optical disk, while the rewritable area is located on the outer portion of the optical disk.

Accordingly, the control data signal is recorded in the read-only area located on the inner portion of the optical disk, as in the case of the read-only optical disk, under the same sector format as that used for the read-only optical disk.

As a result, a drive which is compatible with both the rewritable optical disk and the read-only optical disk can reproduce data from whichever optical disk mounted in the drive, the rewritable optical disk or the read-only optical disk, under the same format. The drive can also detect the control signals recorded on both the rewritable optical disk and the read-only optical disk, and activate these optical disks easily. This eliminates the necessity of providing a special region such as the PEP region described above.

Thus, the invention described herein makes possible the advantage of providing an optical disk where control data signals are recorded under a format which can be easily read regardless of the type of the optical disk is, a read-only DVD or a rewritable DVD, and redundancy is reduced to improve the recording capacity.

These and other advantages of the present invention will become apparent to those skilled in the art upon reading and understanding the following detailed description with reference to the accompanying figures.

BRIEF DESCRIPTION OF THE DRAWINGS

FIG. 1 is a schematic view of a layout of areas of an optical disk according to the present invention.

FIG. 3A schematically shows an array of marks in a PEP region of a conventional optical disk, FIG. 3B shows a change in reflection light amount, and FIG. 3C shows a waveform of a reproduction signal obtained after band limit.

DESCRIPTION OF THE PREFERRED EMBODIMENTS

Hereinbelow, the present invention will be described by way of example with reference to the accompanying drawings.

While the present specification uses DVDs as an example, it should be understood to be applicable to CDs and other media.

Figure 2:
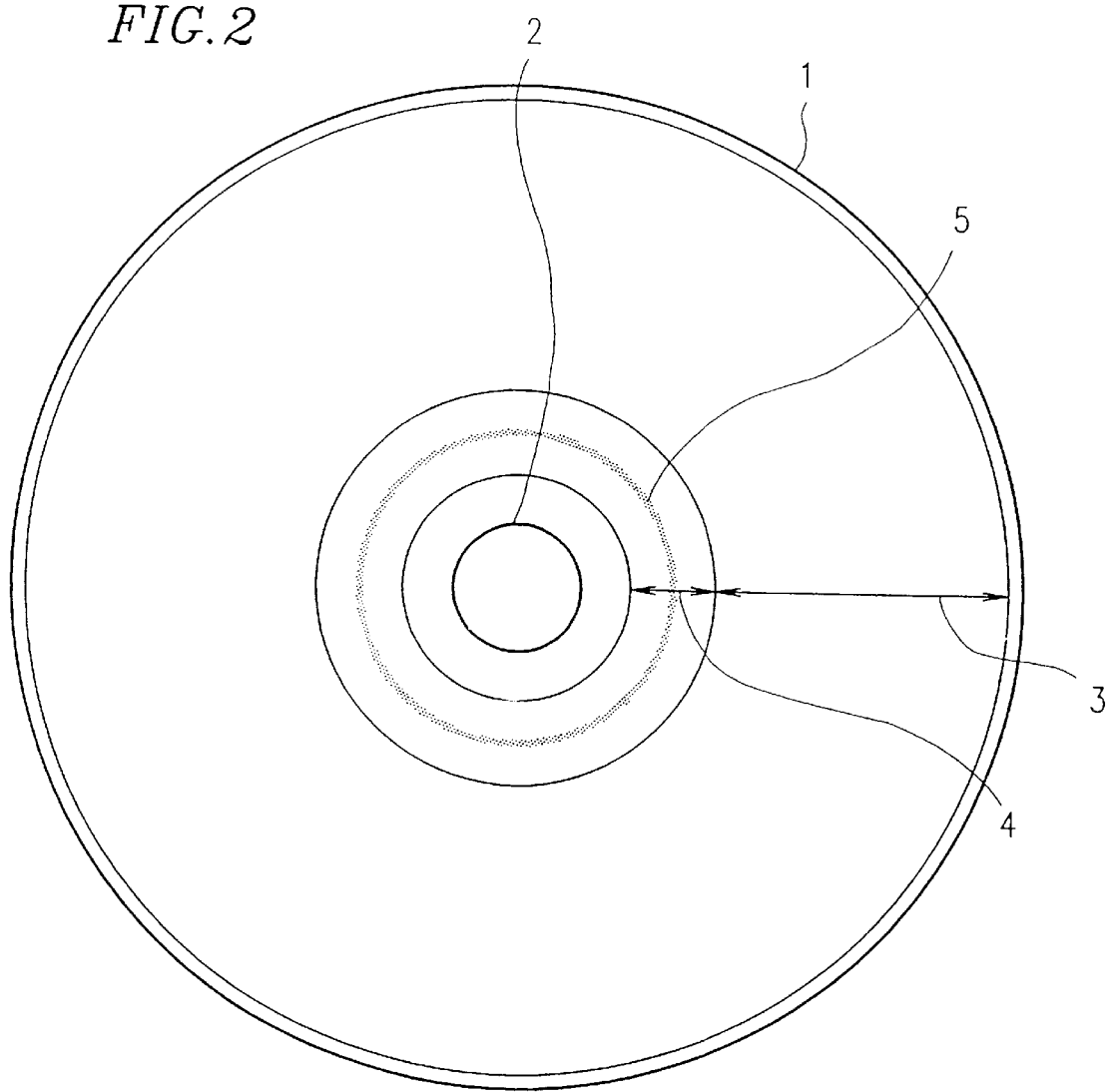
FIG. 2 is a schematic view of an appearance of the optical disk according to the present invention.
Figure 4:
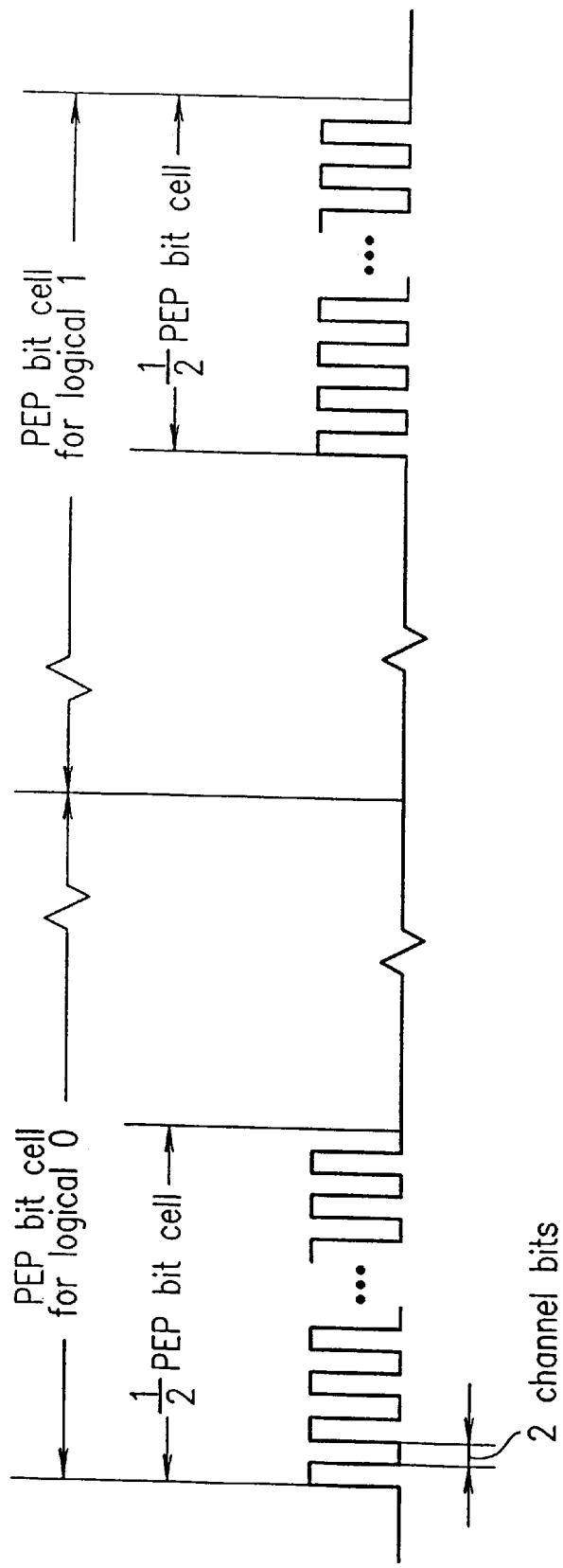
FIG. 4 is a schematic view of forms of bit cells in the PEP region of the conventional optical disk.
Figure 5A:
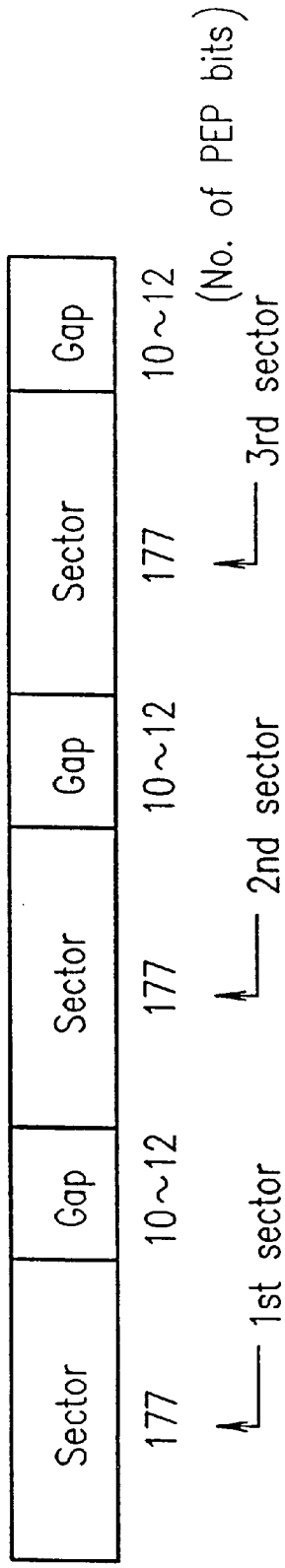
FIGS. 5A and 5B are schematic views of a track format and a sector format, respectively, of the PEP region of the conventional optical disk.
Figure 5B:
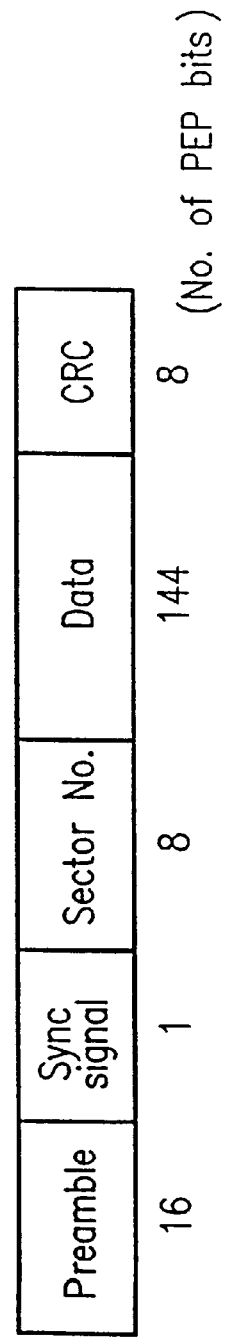
Figure 6:
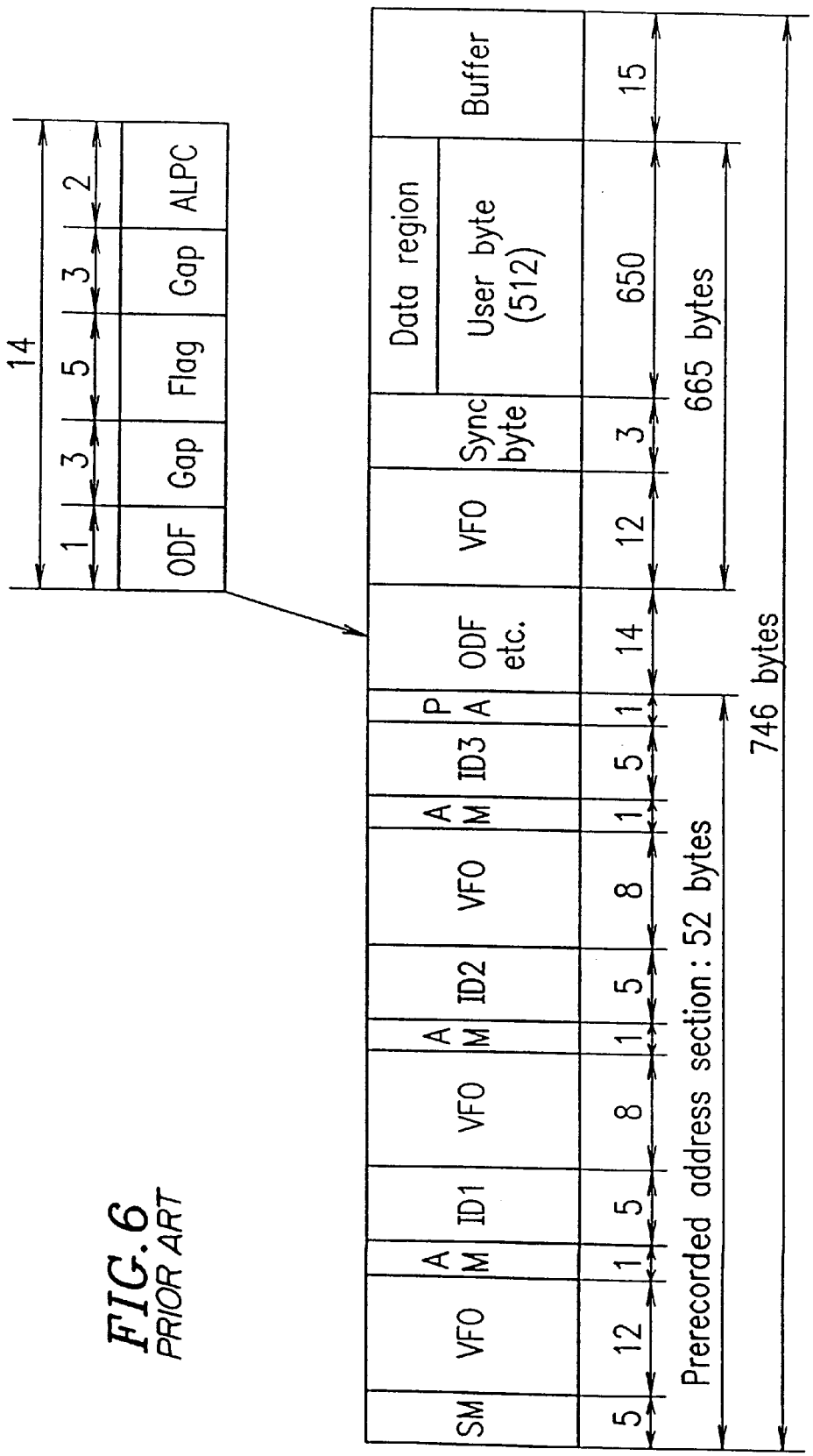
FIG. 6 is a schematic view of a sector format of a conventional optical disk.

As an example of the optical disk according to the present invention, a rewritable DVD which is compatible in format with the conventional read-only DVD described above will be described. The appearance of the optical disk is shown in FIG. 2. Referring to FIG. 2, an optical disk 1 has a center hole 2 and a rewritable area 3 for recording data. Spiral grooves are formed on the rewritable area 3, and the grooves and lands between adjacent grooves are used as tracks. A read-only area 4 is provided on the inner side of the rewritable area 3. In this example, a control data zone 5 where control data representing various types of detailed information on the disk is provided in the read-only area 4.

Figure 7A:
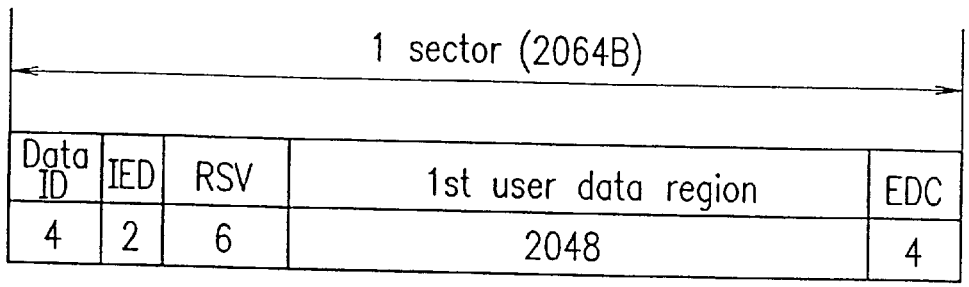
FIGS. 7A, 7B, and 7C are schematic views of sector formats of a read-only area of the optical disk according to the present invention.
Figure 7B:
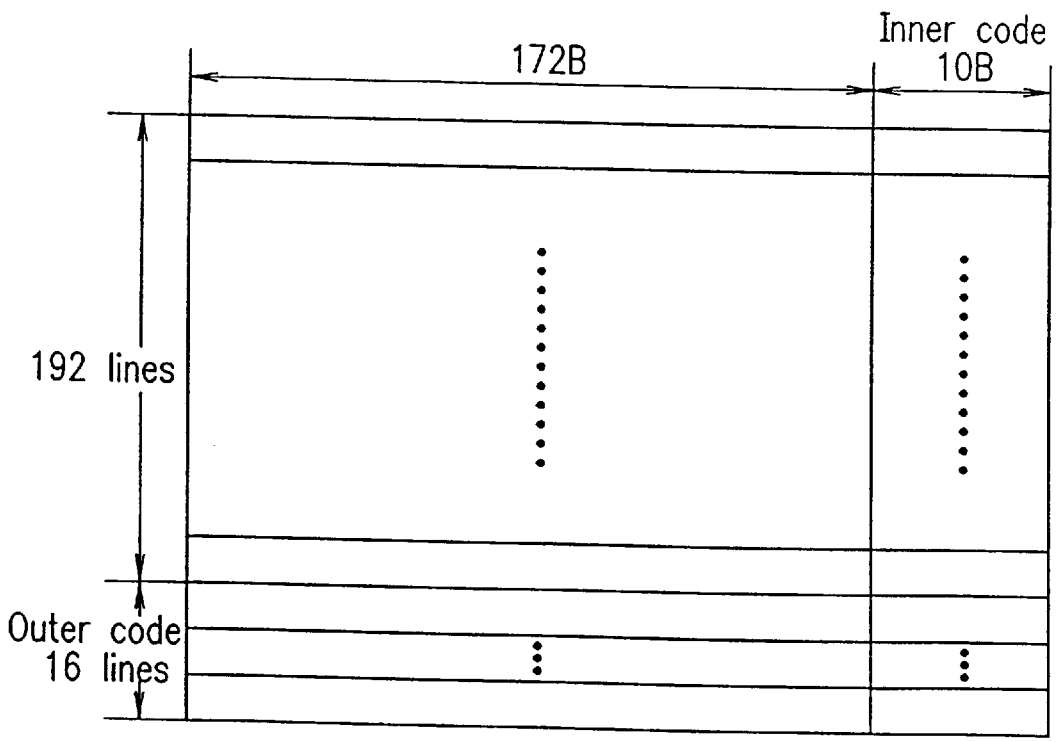
Figure 7C:
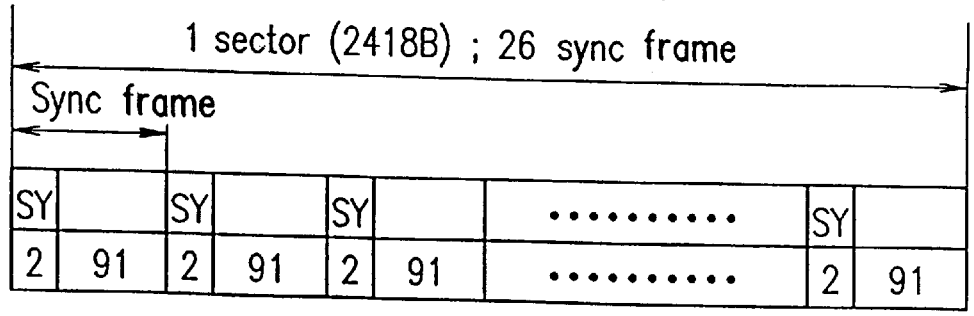
Figure 8:
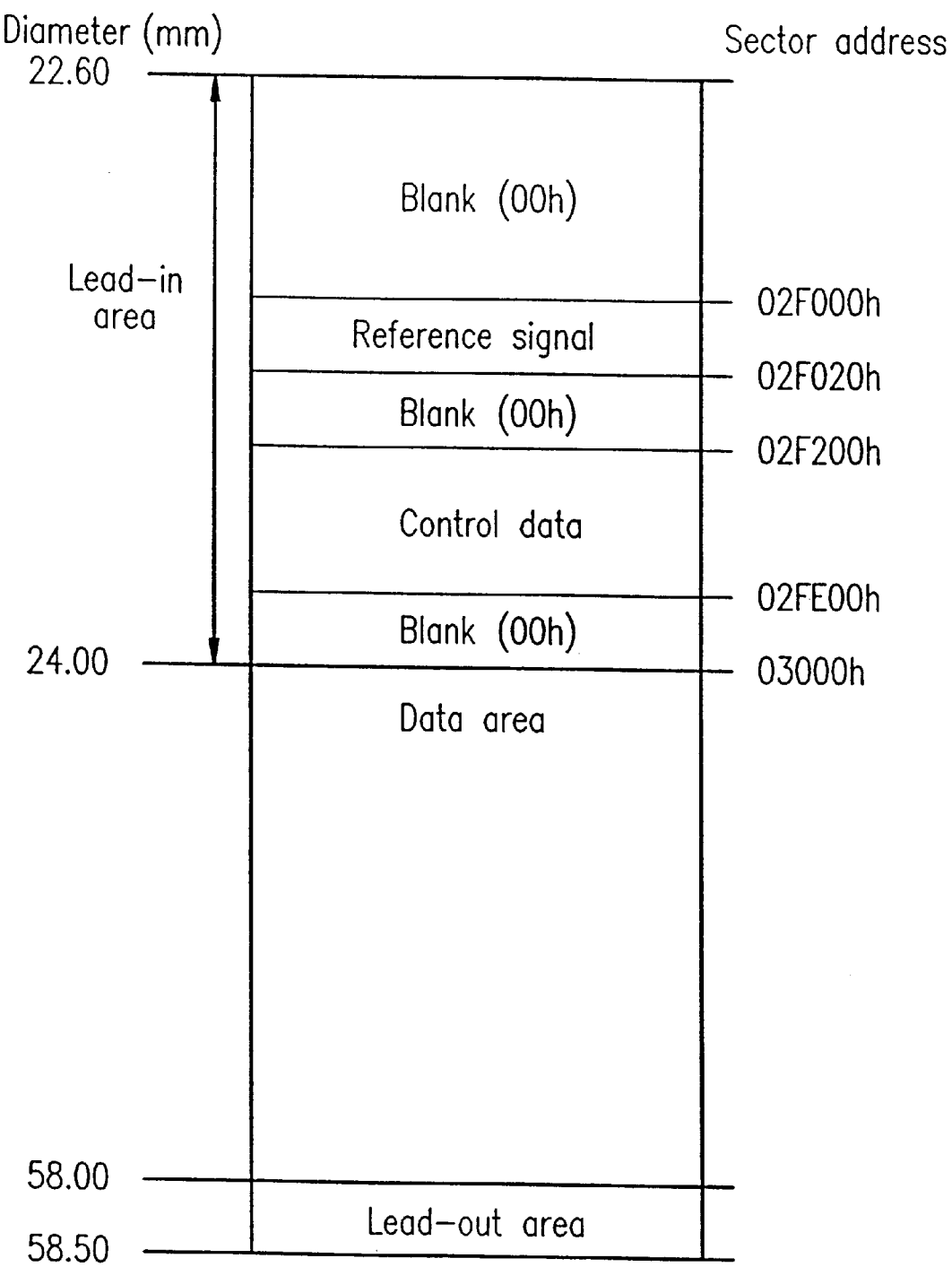
FIG. 8 is a schematic view of a layout of areas of a conventional read-only DVD.

The sector format shown in FIGS. 7A to 7C described above is used for the read-only area 4. That is, a 2048 B first data signal together with a data ID, an error correction code, a synchronization code, and the like constitute data with a sector length of 2418 B. The resultant data is prerecorded on the disk as a pit array.

Figure 9:
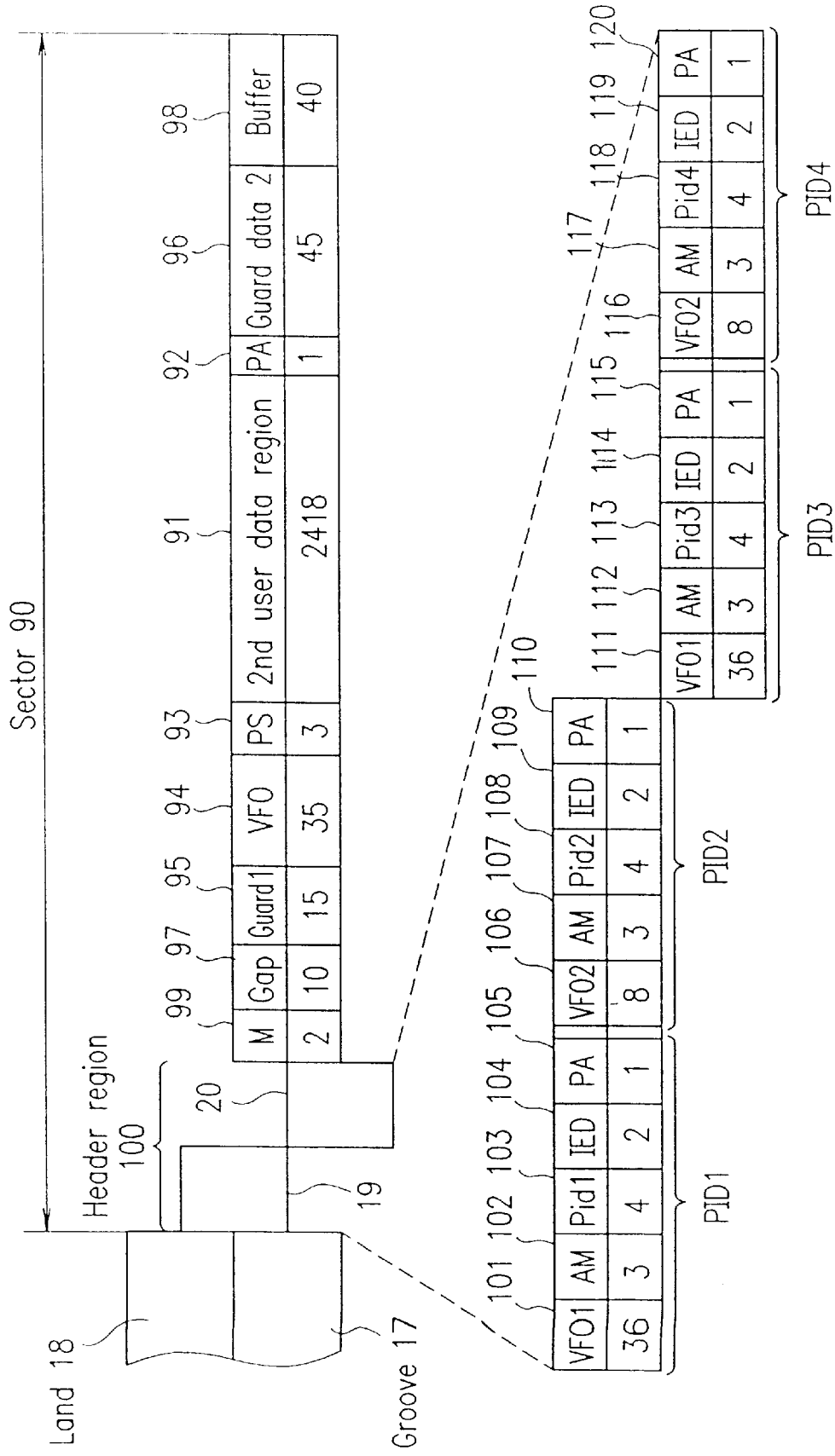
FIG. 9 is a schematic view of a sector format of a rewritable area of the optical disk according to the present invention.

The sector format shown in FIG. 9 described above is used for the rewritable area 3. That is, user data is divided into 2048 B units of first data signals. Each first data signal is transformed into a 2418 B second data signal having the same configuration as the format for the read-only area shown in FIG. 7C. Data required to provide the rewritability is added to the second data signal to obtain a 2567 B third data signal. A space for recording this size of data is secured on a track, and a 128 B header region and a 2 B mirror region are added to the third data signal, thereby to obtain a rewritable sector with a total length of 2697 B. According to this format shown in FIG. 9, therefore, the 2418 B data of one sector of the read-only DVD can be recorded in the user data region of one sector of the rewritable DVD as a unit without any change.

In order to indicate the address numbers of the two sectors on the adjacent groove and land tracks, the first half 19 and the second half 20 of the header region of the rewritable area are displaced from the center line of the groove in the opposite radial directions from each other by about a quarter of the pitch of the groove.

In order to achieve the above arrangement, the header regions on the tracks need to be aligned in the radial direction of the disk. This arrangement results in having the same number of sectors for all tracks including inner and outer tracks, thereby reducing the recording density of the outer tracks.

In order to overcome the above problem, the rewritable area is divided into a plurality of zones. The number of sectors per track is the same within each zone, and is increased by one sector as the zones are closer to the outer circumference of the disk.

For example, when data is recorded on a phase-change recording material under the format shown in FIG. 9 using a semiconductor laser with a wavelength of 650 nm and an objective lens with an NA of 0.6, the minimum bit length of about 0.41 μm is realized. If the radial position of the innermost end of the rewritable area is set at 24.0 mm which is substantially the same as the radial position of the innermost end of the data area of the read-only disk, 17 sectors can be formed on each track in the innermost zone. By increasing the number of sectors per track by one sector for each zone while the minimum bit length is kept substantially the same, a total of 24 zones are obtained for a disk with a diameter of 12 cm, and 40 sectors are formed on each track in the outermost zone. In this case, the total user data capacity of the disk is about 2.6 GB.

When data is recorded on/reproduced from the disk with the above sector arrangement, the following two driving methods may be employed: an MCAV driving method in which, while the disk is rotated at a constant rotational speed, the frequency of the recording/reproduction is changed every zone; and a ZCLV driving method in which the rotational speed is changed every zone so that the linear velocity is substantially the same among the zones, while it is fixed within each zone.

Hereinbelow, a mastering process for fabricating the disk with the above format will be described. The mastering includes recording signals according to the format using a light source with a short wavelength such as a gas laser while rotating a glass plate applied with a photosensitive agent (resist).

An EO modulator or the like is irradiated with laser light from the light source. When electric signals according to the format is applied to the EO modulator, the intensity of the light passing through the EO modulator is modulated. The modulated light is focused with the objective lens onto the glass plate to illuminate the photosensitive agent.

By developing the glass plate, prerecord pits and grooves are formed on the glass plate. A metal mask is formed by plating using the plate as a resist original disk. A resin disk substrate is then formed based on the metal mask, though detailed description is omitted here. In this mastering process, a turn table for rotating the glass plate rotates with high precision. Accordingly, a turn table with a large inertia force is used, and thus it is difficult to change the rotational speed instantaneously during the mastering.

In this example, as described above, the read-only area 4 is provided on the inner portion of the disk as shown in FIG. 2. The same sector format as that used for the read-only DVD is used for the read-only area 4.

However, the read-only DVD is driven by the CLV driving method where the linear velocity is constant as described above, while the rewritable DVD is driven by the MCAV or ZCLV driving method. If the different driving methods are employed for the read-only area and the rewritable area, switching of the rotational speed is required. Switching of the rotational speed during the mastering of the disk is difficult as described above.

In this example, therefore, data is recorded on the read-only area at a constant rotational speed of the disk. The read-only area of the resultant disk is driven by the same driving method as that for the rewritable area, i.e., the MCAV or ZCLV driving method. Since the sectors in the read-only area are arranged at the constant rotational speed, the period of the reproduction of the sectors becomes constant. As a result, even if the address of a sector fails to be reproduced, it can be easily interporated from the positions of the preceding and following sectors.

The thickness of the photosensitive agent applied to the glass plate in the mastering process is made substantially uniform. This thickness corresponds to the depth of the grooves in the rewritable area.

For example, the depth of the grooves in the rewritable area is determined to be optically about $\lambda/8$ so as to obtain a large tracking signal. In the read-only area, the depth of the grooves, which corresponds to the depth of the pits, is determined to be optically about $\lambda/4$ so as to obtain a large contrast of reproduction signals. The depth of the pits in the read-only area is therefore larger than that of the grooves in the rewritable area. It is difficult to change the depth of the grooves and the pits between the read-only area and the rewritable area of the same disk. In this example, therefore, the depth of the pits in the read-only area is made substantially the same as the depth of the grooves in the rewritable area.

More specifically, the depth of the pits in the read-only area is made smaller than the depth of the pits in the read-only disk (optically about $\lambda/4$). To compensate for the failure in obtaining a large contrast of the reproduction signals, the length of the shortest pits is made larger than that of the read-only disk. For example, the length of the shortest pits is 0.41 $\mu$m which is the same bit length as that used in the rewritable area.

In this example, the sector format is different between the rewritable area and the read-only area. For example, while the length of the sector is 2418 B in the read-only area, it is 2697 B in the rewritable area. The innermost zone of the rewritable area has 17 sectors per track. The number of sectors per track in the read-only area when the minimum bit length is substantially the same is calculated as follows.

$$17 \times 2697/2418 = 18.9 \ldots$$

In consideration of the facts that the read-only area is located nearer the inner circumference of the disk than the rewritable area and that the number of sectors per track should be an integer, the number of sectors per track in the read-only area is determined to be 18 sectors.

Figure 10:
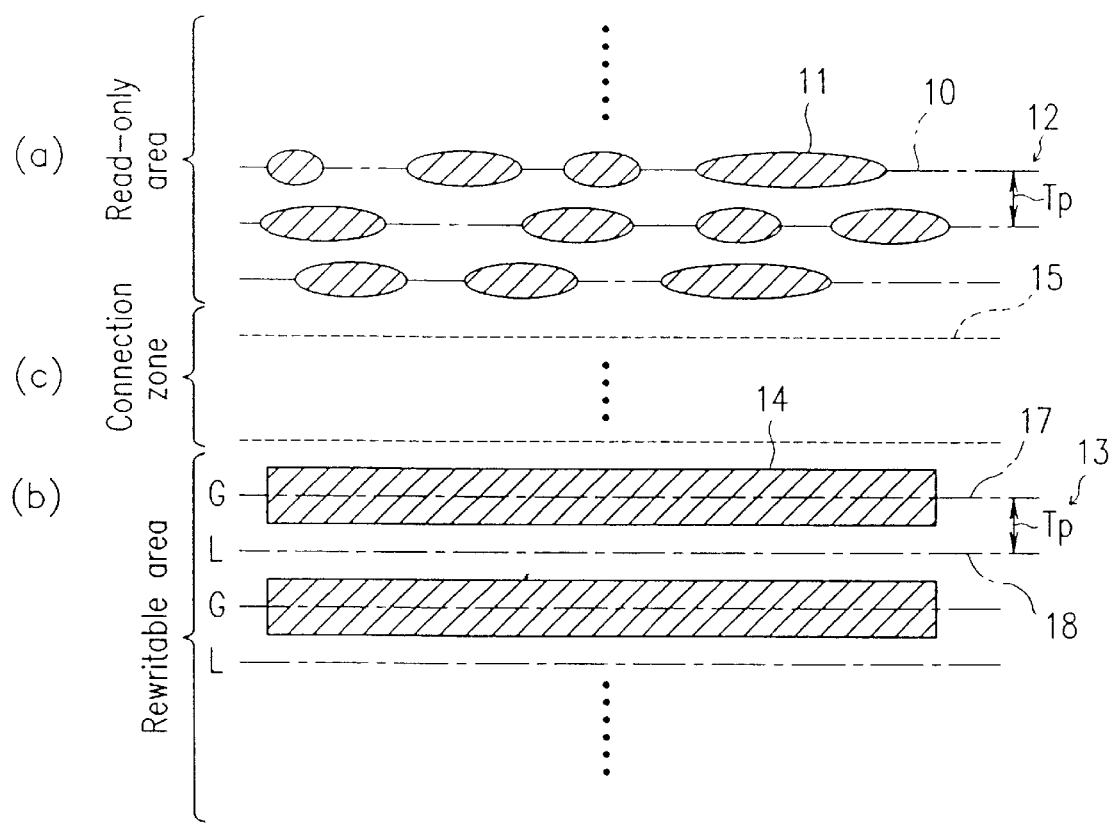
FIG. 10 is a schematic view showing the boundary portion between the rewritable area and the read-only area of the optical disk according to the present invention.

In this example, the track pitch is substantially the same in the rewritable area and the read-only area. FIG. 10 schematically shows the tracks at the boundary between the rewritable area and the read-only area. Portion (a) denotes the read-only area and portion (b) denotes the rewritable area. In the read-only area (a), prerecorded pits 11 are formed along each track 10. A track pitch Tp 12 is determined by the degree of crosstalk of the reproduction signals and the like. For example, the track pitch is 0.74 $\mu$m in the read-only DVD.

In the rewritable area (b), grooves 14 are formed. The grooves are used as groove tracks 17 and lands between the grooves are used as land tracks 18. A track pitch Tp 13, which is a gap between the adjacent groove track and land track, is substantially the same as the track pitch 12 in the read-only area.

The groove pitch is therefore double the track pitch. The track widths of the groove tracks and the land tracks are made substantially the same. Therefore, the groove width and the track pitch should be substantially the same. In order to form wide grooves, the laser beam used in the mastering process for recording data needs to be large in the radial direction.

When such a wide beam is used in the read-only area, the resultant pits are large in width, thereby narrowing the gap between the adjacent pits. This increases crosstalk of the reproduction signals. To avoid this problem, two different laser beams are used, where one of the laser beams is small for recording small pits in the read-only area and the other is large for forming grooves in the rewritable area.

However, at the switching of the laser beams for pits and for grooves at the boundary between the rewritable area and the read-only area, if the spot positions of the two laser beams on the disk surface are deviated from each other, the recorded pit array and the groove are not formed in succession, but overlap each other or are spaced apart from each other. It is practically difficult to put the spot positions of the two laser beams in conformity with each other two-dimensionally on the disk surface. It is therefore impossible to connect the rewritable area and the read-only area with the same track pitch at the boundary thereof.

In the read-only area, the pit array is continuously recorded starting from the innermost end of the area. At the outermost end of the read-only area, therefore, errors may be accumulated, and thus the position of the end of the last sector may be shifted.

In this example, therefore, a connection zone is provided between the rewritable area and the read-only area as shown as portion (c) in FIG. 10. This connection zone of a first example constitutes a flat (mirror) zone since no signal is recorded. Positioning of the two beams is practically possible when the width of the connection zone is 1 μor more.

If the connection zone is wide, a tracking error signal is not generated when the connection zone is irradiated with laser light for servo tracking at the reproduction of data from the resultant disk with a drive. This makes the operation unstable. More specifically, when a disk is mounted on a drive and rotated, eccentricity more or less occurs. If the size (width in the radial direction) of the mirror zone is smaller than the minimum amount of the eccentricity, the laser beam from the drive necessarily crosses the pit array in the read-only area or the groove in the rewritable area during one rotation of the disk. The allowance of the eccentricity amount for a normal disk is about ±50 μm at maximum. Therefore, in consideration of the minimum amount of the eccentricity, the width of the mirror zone in the radial direction may be about 5 μm. The mirror zone with this width corresponds to 2 to 8 tracks when calculated with the above track pitch. In FIG. 10, virtual tracks 15 are shown in the connection zone (c).

A second example of the connection zone according to the present invention will be described. The first example of the connection zone constitutes a mirror zone as described above. In the second example of the connection zone, dummy data is recorded. As the dummy data, the repetition of the 4-channel-bit pattern, " . . . 1000 1000 . . . ", used for the VFO region shown in FIG. 9 is used.

The dummy data is recorded along the tracks 15 shown in FIG. 10 covering two to three tracks. Then, one or two empty grooves without header regions are recorded (two to four tracks), followed by the formation of sectors with header regions. With this configuration, even if the spot positions of the laser beam are deviated from each other by about 1 μm, only the dummy data and the empty grooves overlap each other, not destroying necessary data. By forming such a pit array, a tracking error can be detected stably in the connection zone.

In a third example of the connection zone according to the present invention, the dummy data in the connection zone has a sector configuration. For example, when dummy data under the format for the read-only area is recorded, sectors as shown in FIG. 7 where the, first user data is all 00h are formed. When dummy data under the format for the rewritable area is recorded, grooves of sectors with the header regions as shown in FIG. 9 are formed. With this configuration, as in the above two examples, even if the spot positions of the laser beam are deviated from each other by about 1 μm, only the sectors of dummy data overlap each other, not destroying necessary data. By forming the pit array as dummy data, the tracking error can be detected stably in the connection zone.

Even if part of a sector fails to be read, no problem arises since it is dummy data. It is possible to set so that the addresses of the sectors in the connection zone are not usable. By forming such a sector array in the connection zone, a tracking error can be stably detected. Moreover, since the sector addresses can be detected, the positions of the respective sectors on the disk are identified, thereby facilitating the system management.

FIG. 1 shows a layout of the areas of the rewritable optical disk according to the present invention. In FIG. 1, respective zones in the areas are listed in the order from the inner side to the outer side of the disk, together with the rough radial position of each zone, the address of the head sector of each zone, the number of blocks included in each zone, the number of tracks in each area, and the data ID number indicating the logical address of data in head sector of each zone. The sector address indicates the physical address of the sector, which is recorded in the Pid regions of the header region for each sector in the rewritable area and recorded as the data ID number for each sector in the read-only area.

The data ID number indicates the logical address of the data recorded in the sector. In the lead-in area and the lead-out area, the physical address and the logical address of each sector are the same. In each of the rewritable sectors in the lead-in and lead-out areas, the data ID number included in the rewritable data region (second data signal region) is the same as the physical address of the sector. The sectors in the data area are all rewritable sectors. The data ID number in each of these sectors indicates the logical address of data recorded in the sector.

Referring to FIG. 1, the read-only area is located on the inner portion of the disk. The innermost end of the read-only area is at a diameter of 22.6 mm of the disk, as in the case of the read-only DVD. The rewritable area starts at a diameter of 24.00 mm of the disk, as in the case of the data area of the read-only DVD, and expands to the outer circumference of the disk.

The sector address is 30000 in the hexadecimal notation (denoted as 30000h) at the head of the rewritable area, and increases by 1h every sector toward the outer circumference of the disk. In the read-only area, the sector address decreases by 1h every sector toward the inner circumference of the disk. A portion of the rewritable area over 256 ECC blocks (4096 sectors) from the head thereof is used for testing of the disk and the drive and the like. This portion of the rewritable area is included in the lead-in area which starts from the innermost end of the read-only area.

The data area follows the lead-in area for effecting the recording/reproduction of user data. The data area is divided into 24 zones from zone 0 to zone 23. The address of the head sector in the data area is 31000h. The lead-out area follows the data area.

Hereinbelow, the respective areas will be described in detail.

In the read-only area portion of the lead-in area, a reference signal zone for recording a reference code is provided over one ECC block covering sector addresses starting from 2F000h to 2F010h. The reference code is used for identification of the disk manufacturer, reproduction adjustment, and the like. A control data zone for recording control data signals is provided over 192 blocks covering sector addresses starting from 2F200h to 2FE00h. The other portions of the read-only area constitute blank zones, where the first data signal is recorded as 00h in each sector under the same sector format as that used for the other portions.

In this way, the same sector addresses as those used for the read-only DVD described above are used for the control data zone of the read-only area of the rewritable optical disk according to the present invention. With this arrangement, it is possible for a drive compatible with these two types of disks to always seek the same sector addresses to reproduce the control data signals from the sectors of the same addresses. Therefore, such a drive compatible with the two different types of disks can follow the same procedure to activate these disks.

The connection zone follows the read-only area to obtain a smooth shift from the read-only area to the rewritable area. As described above, in the first example of the connection zone, the mirror zone is provided over a portion corresponding to two to eight tracks. Since no signal is recorded in the mirror zone, the last sector of the final blank zone of the read-only area is the sector immediately before the sector address 30000h of the head sector in the rewritable area. The address of the last sector of the final blank zone is therefore 2FFFFh. The final blank zone includes 32 blocks covering sector addresses from 2FE00h following the control data zone to 2FFFFh.

In the second example of the connection zone, the connection zone includes dummy data and empty grooves having no sector address as described above. Accordingly, the address arrangement as that in the first example of the connection zone can be used.

In the third example of the connection zone, the dummy data has a sector configuration. The addresses of the sectors in the connection zone may be preset to be unusable. The connection zone preferably has an integer number of tracks and corresponds to an integer number of blocks.

For example, when the connection zone has eight tracks, it corresponds to nine blocks. In this case, the number of blocks in the final blank zone preceding the connection zone is reduced by nine blocks to 23 blocks (sector addresses from 2FE00h to 2FF6Fh). The nine blocks is added to the connection zone, to add a region covering sector addresses from 2FF70h to 2FFFFh to the connection zone. As a result, the connection zone is a zone covering sector addresses from 2FF70h to 30000h.

Although no address was allocated to the first and second examples of the connection zones, it is possible to allocate addresses to the connection zones which have no sector configuration, as in the case of the third example of the connection zone.

The portion of the rewritable area located in the lead-in area follows the connection zone. A guard track zone is first provided. The guard track zone starts at sector address 30000h and covers 32 blocks until sector address 301FFh. The guard track zone prevents other data from being destroyed due to an error such as the tracking being off when a test signal is recorded in a subsequent disk test zone. No data is recorded in the sectors in this zone.

The disk test zone is provided over the next 64 blocks covering sector addresses from 30200h to 305FFh for the testing of the disk quality and the like by the disk manufacturer. A drive test zone is provided over the next 112 blocks covering sector addresses from 30600h to 30CFFh for the testing such as setting of a laser power in a drive. Another guard track zone is provided over the next 32 blocks covering sector addresses from 30D00h to 30EFFh for effecting functions similar to those of the above guard track zone. A disk ID zone is provided over the next eight blocks covering sector addresses from 30F00h to 30F7Fh for recording copying management information. DMA 1&2 zones are provided over the next eight blocks covering sector addresses from 30F80h to 30FFFh for disk defect management.

The data area starts from the next address 31000h. The data area is divided into 24 zones from zone 0 to zone 23 as described above. Each zone is composed of 1888 tracks with an exception that zone 0 includes only 1647 tracks because the portion covering 256 blocks (4096 sectors) from the head of the rewritable area belongs to the lead-in area as described above. The number of blocks included in each zone is shown in FIG. 1 as an example. About 95% of the blocks in each zone are used as data blocks for recording user data. The logical address of each sector included in the data blocks represents an address obtained by adding the logical address to the physical address of the head sector in the data area (address 31000h in this example).

To the head and end of each zone in the data area, 48 to 80 sectors (corresponding to two or more tracks) are allocated as buffer sectors. Such buffer sectors are provided because at each boundary of zones the header region sometimes fails to be continuous with the preceding sector, and therefore no data is recorded in the buffer sectors. Most of the remaining 5% of the blocks in each zone serve as spare sectors, which replace sectors in the data blocks when they become defective, to be used as sectors for data recording.

The physical address of the sector is used for data recording changes by the above replacement. However, the logical address (data ID number) of the user data does not change as described above. Accordingly, a table associating the physical address of the sector with the logical address is prepared and recorded in the DMA zones.

The lead-out area follows zone 23, starting from the sector address 16B480h and expanding to the outermost circumference of the disk. Substantially the same zones as those in the portion of the rewritable area located in the lead-in area are allocated for the lead-out area. DMA 3&4 zones are first provided at the head of the lead-out area for disk defect management as described above. Thus, the four DMA zones, the DMA 1&2 zones on the inner side and the DMA 3&4 zones on the outer side, sandwich the data area. A disk ID zone is provided over the next eight blocks covering sector addresses from 16B500h to 16B57Fh for recording copying management information.

A guard track zone is provided over the next 32 blocks covering sector addresses from 16B580h to 16B77Fh. No data is recorded in this zone. A drive test zone is provided over the next 112 blocks covering sector addresses from 16B780h to 16BE7Fh for the testing such as setting of a laser power in a drive. A disk test zone is provided over the next 112 blocks covering sector addresses from 16BE80h to 16C57Fh for the testing of the disk quality and the like by the disk manufacturer. Another guard track zone is provided for over 3343 blocks covering sector addresses from 16C580h to 17966Fh. No data is recorded in this zone.

Thus, as is observed from the layout of the areas of the optical disk according to the present invention, the rewritable area starts at a diameter of 24.00 mm of the disk as in the case of the data area of the read-only DVD. The address of the head sector in the rewritable area is the same as the address of the head sector in the data area of the read-only DVD. Also, the addresses of the sectors in the control data zone is the same as the addresses of the sectors in the control data zone of the read-only DVD. With this arrangement, it is possible for a drive compatible with these two types of disks to always seek the same sector addresses to reproduce the control data signals from the sectors of the same addresses. Therefore, such a drive compatible with the two different types of disks can follow the same procedure to activate these disks. As a result, effective control of the drive is realized.

An alternative example of the layout of the rewritable area of the rewritable optical disk according to the present invention will be described. The logical address of each sector included in the data blocks of the data area is the same as the address of each sector in the data area of the read-only DVD. While the address of the head sector in the data area of the read-only DVD is 30000h, the physical address of the head sector in the data area of the rewritable optical disk according to the present invention is 31000h.

In this alternative example, the logical address of the head sector in the data area is set at 30000h so as to be the same as the address of the head sector in the data area of the read-only DVD. The logical address of each sector in the subsequent data blocks is obtained by adding the logical address to the logical address of the head sector (30000h in this alternative example).

With this address setting, the logical addresses of the sectors in the data blocks overlap the addresses of the sectors in the portion of the rewritable area located in the lead-in area. This problem can be solved by adding to the data ID number of each sector the type of the area the sector belongs to, so that whether the sector is in the lead-in area or in the data area can be judged.

Thus, in the alternative example according to the present invention, the logical addresses of the sectors the data blocks in the data area are the same as the addresses of the sectors in the data area of the read-only DVD. With this arrangement, it is possible for a drive compatible with these two types of disks to always seek the same sector addresses to reproduce the control data signals from the sectors of the same addresses. Therefore, such a drive compatible with the two different types of disks can follow the same procedure for the activation of these disks. As a result, effective control of the drive is realized.

In the above examples according to the present invention, the format shown in FIGS. 7A to 7C was used as the sector format for the read-only area, and the format shown in FIG. 9 was used as the sector format for the rewritable area. The sector formats are not restricted to these, but the sector format for the "130 mm rewritable optical disk" described above can also be used.

Thus, the optical disk according to the present invention includes the read-only area where a plurality of read-only tracks are formed and the rewritable area where a plurality of rewritable tracks are formed. Each of the plurality of read-only tracks is divided into a plurality of first sectors. A signal is prerecorded in at least one of the plurality of first sectors under a predetermined reproduction format. Each of the plurality of rewritable tracks is divided into a plurality of second sectors. A signal is recordable in at least one of the plurality of second sectors under a predetermined recording format including the predetermined reproduction format. The read-only area is located on the inner portion of the optical disk, while the rewritable area is located on the outer portion of the optical disk.

Accordingly, the control data signal is recorded in the read-only area where a region for recording header information is not provided. This means that the control data signal is recorded under the reproduction format for the first sectors in the read-only area which is lower in redundancy than the sector format for the second sectors in the rewritable area. This improves the efficiency of the recording region of the rewritable optical disk.

Also, the optical disk according to the present invention is compatible with the read-only optical disk, and includes the read-only area where a plurality of read-only tracks are formed and the rewritable area where a plurality of rewritable tracks are formed. Each of the plurality of read-only tracks is divided into a plurality of first sectors. A signal is prerecorded in at least one of the plurality of first sectors under a predetermined reproduction format. Each of the plurality of rewritable tracks is divided into a plurality of second sectors. A signal is recordable in at least one of the plurality of second sectors under a predetermined recording format including the predetermined reproduction format. The read-only area is located on the inner portion of the optical disk, while the rewritable area is located on the outer portion of the optical disk.

Accordingly, the control data signal is recorded in the read-only area located on the inner portion of the optical disk, as in the case of the read-only optical disk, under the same sector format as that used for the read-only optical disk.

As a result, a drive which is compatible with both the rewritable optical disk and the read-only optical disk can reproduce data from whichever optical disk mounted in the drive, the rewritable optical disk or the read-only optical disk, under the same format. The drive can also detect the control signals recorded on both the rewritable optical disk and the read-only optical disk, and activate these optical disks easily. This eliminates the necessity of providing a special region such as the PEP region described above.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk comprising a read-only area in which a plurality of read-only tracks are formed and a rewritable area in which a plurality of rewritable tracks are formed, wherein each of the plurality of read-only tracks is divided into a plurality of first sectors, a signal is prerecorded in at least one of the plurality of first sectors under a predetermined reproduction format, each of the plurality of rewritable tracks is divided into a plurality of second sectors, a signal is recordable in at least one of the plurality of second sectors under a predetermined recording format which includes the predetermined reproduction format as a part thereof and further includes another part specific to the predetermined recording format, and the read-only area is located on an inner portion of the optical disk, while the rewritable area is located on an outer portion of the optical disk.

2. An optical disk according to claim 1, wherein the plurality of first sectors of the plurality of read-only tracks are aligned in a radial direction of the optical disk.

3. An optical disk according to claim 1, wherein a pit array is formed in the read-only area, spiral or concentric grooves are formed in the rewritable area; and the depth of the pit array is substantially the same as the depth of the grooves.

4. An optical disk according to claim 1, wherein the number of the plurality of first sectors is 18 per track.

5. An optical disk according to claim 1, wherein an address of a sector for recording a control data signal in the read only area is the same as an address of a sector for recording a control data signal of a read-only optical disk.

6. An optical disk according to claim 1, wherein an address of a head sector in the rewritable area is the same as an address of a head sector in a data area of a read-only optical disk.

7. An optical disk according to claim 1, wherein a radial position of a head sector in the rewritable area is the same as a radial position of a head sector in a data area of a read-only optical disk.

8. An optical disk according to claim 1, wherein a reference signal for reproduction adjustment is prerecorded in the first sectors of the number equal to a multiple of the number of first sectors included in one error correction block, and the first sectors where the reference signal is prerecorded are located within one cycle of the read-only track.

9. An optical disk according to claim 3, wherein the plurality of first sectors are aligned in a radial direction of the optical disk.

10. An optical disk according to claim 3, wherein the number of the plurality of first sectors is 18 per track.

11. An optical disk according to claim 3, wherein an address of a sector for recording a control data signal in the read only area is the same as an address of a sector for recording a control data signal of a read-only optical disk.

12. An optical disk according to claim 3, wherein an address of a head sector in the rewritable area is the same as an address of a head sector in a data area of a read-only optical disk.

13. An optical disk according to claim 3, wherein a radial position of a head sector in the rewritable area is the same as a radial position of a head sector in a data area of a read-only optical disk.

14. An optical disk according to claim 3, wherein a reference signal for reproduction adjustment is prerecorded in the first sectors of the number equal to a multiple of the number of first sectors included in one error correction block, and the first sectors where the reference signal is prerecorded are located within one cycle of the read-only track.

* * * * *